United States Patent
Akidau et al.

(10) Patent No.: US 11,966,416 B2
(45) Date of Patent: *Apr. 23, 2024

(54) CROSS-ORGANIZATION AND CROSS-CLOUD AUTOMATED DATA PIPELINES

(71) Applicant: Snowflake Inc., Bozeman, MT (US)

(72) Inventors: Tyler Arthur Akidau, Seattle, WA (US); Istvan Cseri, Seattle, WA (US); Tyler Jones, Redwood City, CA (US); Dinesh Chandrakant Kulkarni, Sammamish, WA (US); Daniel Mills, Seattle, WA (US); Daniel E. Sotolongo, Seattle, WA (US); Di Fei Zhang, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,977

(22) Filed: Jan. 31, 2023

(65) Prior Publication Data
US 2023/0315755 A1    Oct. 5, 2023

Related U.S. Application Data

(63) Continuation of application No. 17/657,497, filed on Mar. 31, 2022, now Pat. No. 11,620,310.

(51) Int. Cl.
*G06F 16/00* (2019.01)
*G06F 16/27* (2019.01)

(52) U.S. Cl.
CPC .................. *G06F 16/273* (2019.01)

(58) Field of Classification Search
CPC .................................................. G06F 16/273
USPC ........................................................ 707/615
See application file for complete search history.

(56) References Cited

U.S. PATENT DOCUMENTS

| | | | |
|---|---|---|---|
| 2003/0191793 A1* | 10/2003 | Dolin, Jr. ............... | H04L 67/10 718/103 |
| 2020/0167340 A1* | 5/2020 | Cseri ................. | G06F 16/2308 |
| 2020/0379994 A1 | 12/2020 | Rajaperumal et al. | |
| 2021/0357391 A1 | 11/2021 | Cseri et al. | |

FOREIGN PATENT DOCUMENTS

| | | |
|---|---|---|
| CN | 116894069 A | 10/2023 |
| DE | 202023101653 U1 | 8/2023 |

OTHER PUBLICATIONS

U.S. Appl. No. 17/657,497, filed Mar. 31, 2022, Cross-Organization & Cross-Cloud Automated Data Pipelines.
(Continued)

*Primary Examiner* — Chelcie L Daye
(74) *Attorney, Agent, or Firm* — Schwegman Lundberg & Woessner, P.A.

(57) ABSTRACT

Techniques for triggering pipeline execution based on data change (transaction commit) are described. The pipelines can be used for data ingestion or other specified tasks. These tasks can be operational across account, organization, cloud region, and cloud provider boundaries. The tasks can be triggered by commit post-processing. Gates in the tasks can be set up to reference change data capture information. If the gate is satisfied, tasks can be executed to set up data pipelines.

21 Claims, 9 Drawing Sheets

(56) References Cited

OTHER PUBLICATIONS

"U.S. Appl. No. 17/657,497, Non Final Office Action dated Aug. 4, 2022".
"U.S. Appl. No. 17/657,497, Notice of Allowance dated Dec. 2, 2022", 8 pgs.
"U.S. Appl. No. 17/657,497, Response filed Nov. 4, 2022 to Non Final Office Action dated Aug. 4, 2022".
"European Application Serial No. 23165708.1, Extended European Search Report dated Jul. 27, 2023", 8 pgs.
Microsoft, "3—Choosing a Multi-Tenant Data Architecture", [Online]. Retrieved from the Internet: <URL:https://web.archive.org/web/20130119184049/http://msdn.microsoft.com/en-us/library/hh534480.aspx>, (Jan. 19, 2013), 33 pages.

* cited by examiner

CROSS-ORGANIZATION AND CROSS-CLOUD AUTOMATED DATA PIPELINES

This application is a continuation of U.S. patent application Ser. No. 17/657,497, filed Mar. 31, 2022, which is incorporated herein by reference in its entirety.

TECHNICAL FIELD

The present disclosure generally relates to a network-based database system and, more specifically, to triggering data pipelines for facilitating cross-organization and cross-cloud data sharing.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database system could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

Database data can be modified by various commands, including insert, delete, and update commands that modify one or more rows in a database table. Also, if data is being shared, changes to the data can be hard to share in real time.

Some conventional systems can use polling based on a schedule to check for new changes to data. However, polling techniques can suffer from latency problems.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for triggering pipeline execution based on data change (transaction commit) are described. The pipelines can be used for data ingestion or other specified tasks. These tasks can be operational across account, organization, cloud region, and cloud provider boundaries. Using the techniques described herein, tasks can be implemented and triggered without requiring polling or other types of external messaging mechanisms. Thus, the techniques described herein offer improved speed and data reliability compared to conventional techniques.

Figure 1:
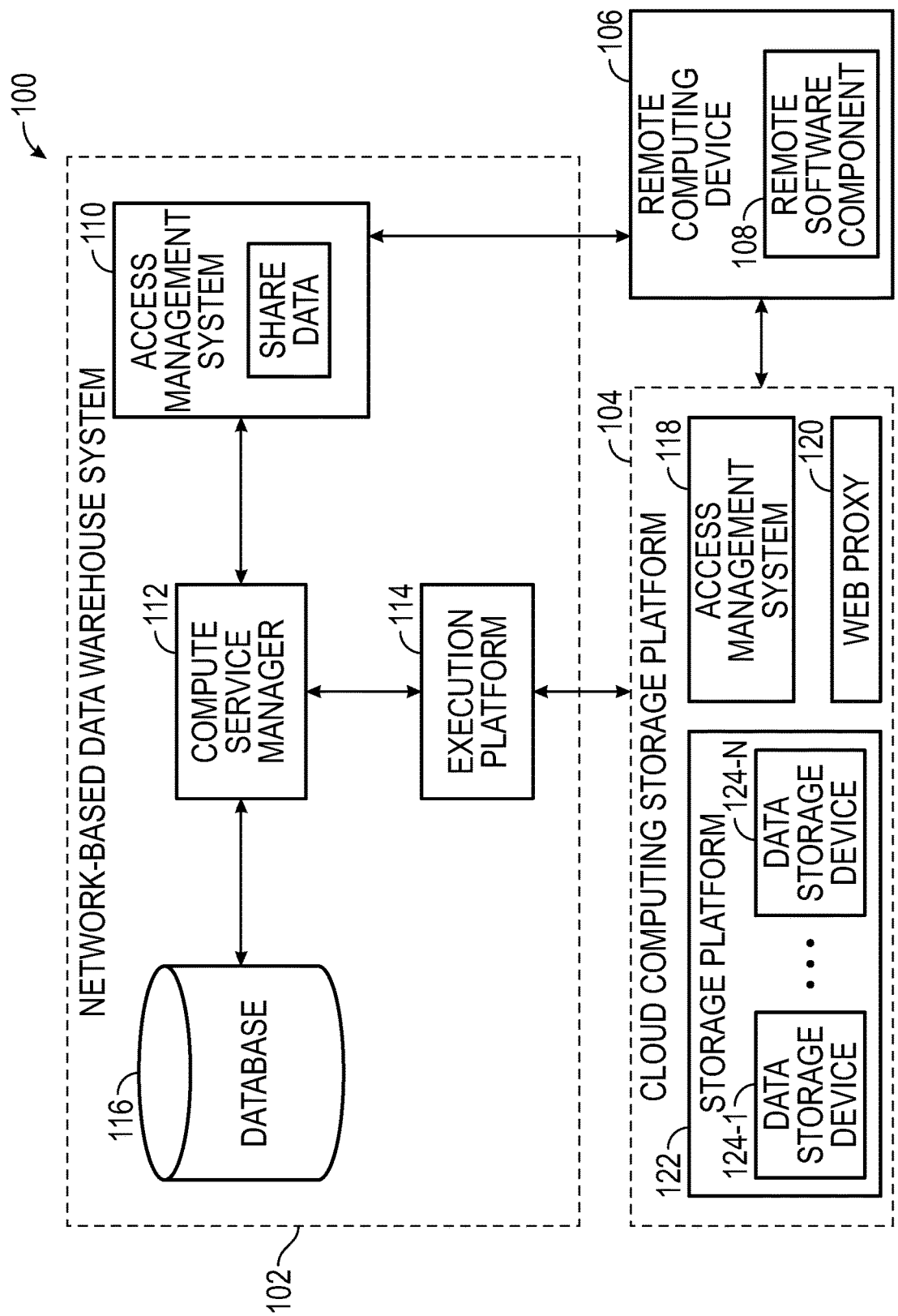
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/ devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
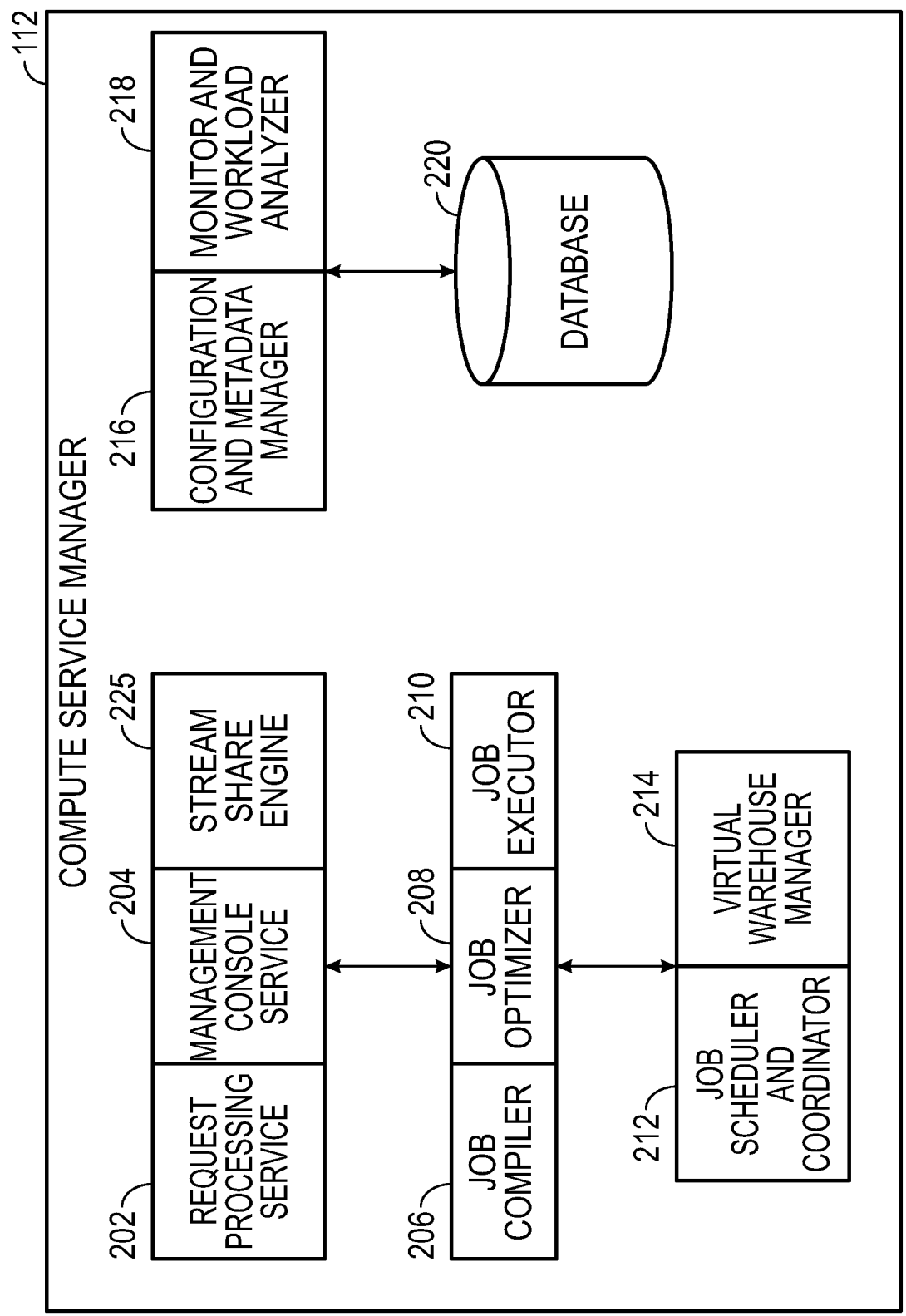
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
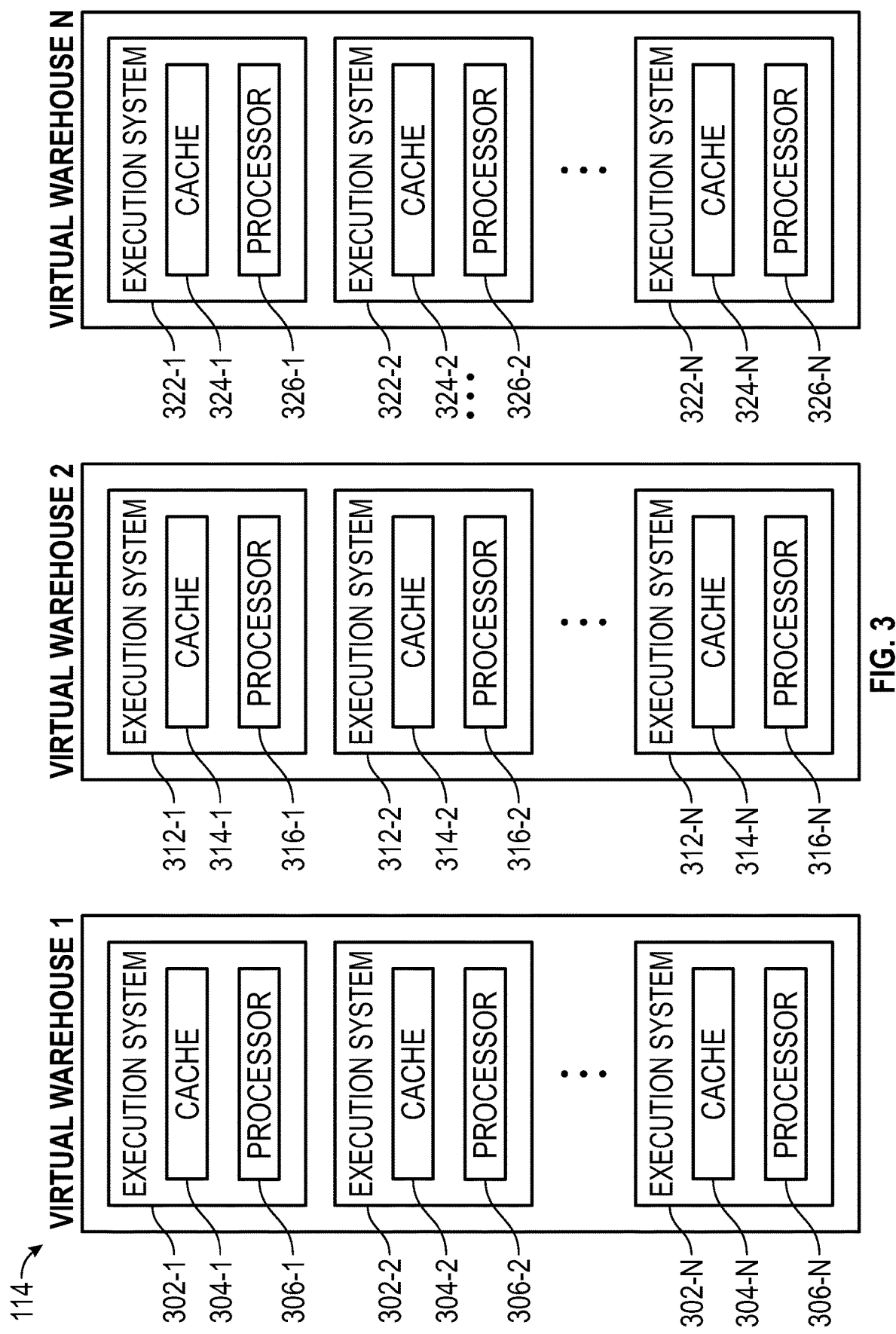
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, techniques for triggering pipeline execution based on data change (transaction commit) are described. The pipelines can be used for data ingestion or other specified tasks. These tasks can be operational across account, organization, cloud region, and cloud provider boundaries. Using the techniques described herein, tasks can be implemented and triggered without requiring polling or other types of external messaging mechanisms. Thus, the techniques described herein offer improved speed and data reliability.

Figure 4:
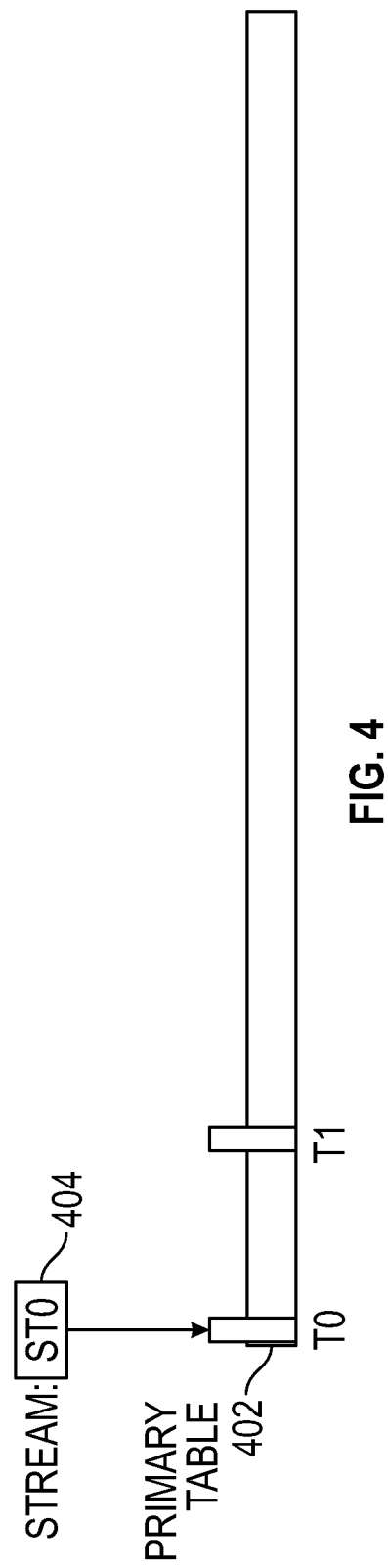
FIG. 4 shows an example of a stream, according to some example embodiments.

The automatic pipeline execution techniques can utilize change data capture (CDC) information, such as streams, to trigger specified tasks. A stream is a virtual table showing CDC information between two versions of a table. FIG. 4 shows an example of a stream, according to some example embodiments. A primary table 402 (also referred to as a base table) may be provided. The primary table 402 may store a set of data, for example customer data for a client. In some embodiments, the primary table 402 may be implemented as a view, which allows a result of a query to be accessed as if it were a table. In some embodiments, the primary table 402 may be implemented as a set of tables.

The primary table 402 is illustrated as having two versions: T0 and T1. The versions may reflect changes (or modifications), such as data manipulation language (DML) operations executed on the primary table 402.

Data in the primary table 402 may automatically be divided into an immutable storage device referred to as a micro-partition (also referred to as a partition). A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can comprise millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A stream 404 (ST0) may be generated from the primary table 402. A stream is a virtual table showing change data capture (CDC) information between two points. Here, stream 404 (ST0) may show the CDC information between T0 and T1 table versions. Being a virtual table, the stream does not store information itself, but instead includes pointers to the underlying information. In this example, the stream 404 (ST0) includes a set of pointers to the primary table 402. Multiple streams may be generated for different points of time.

Figure 5:
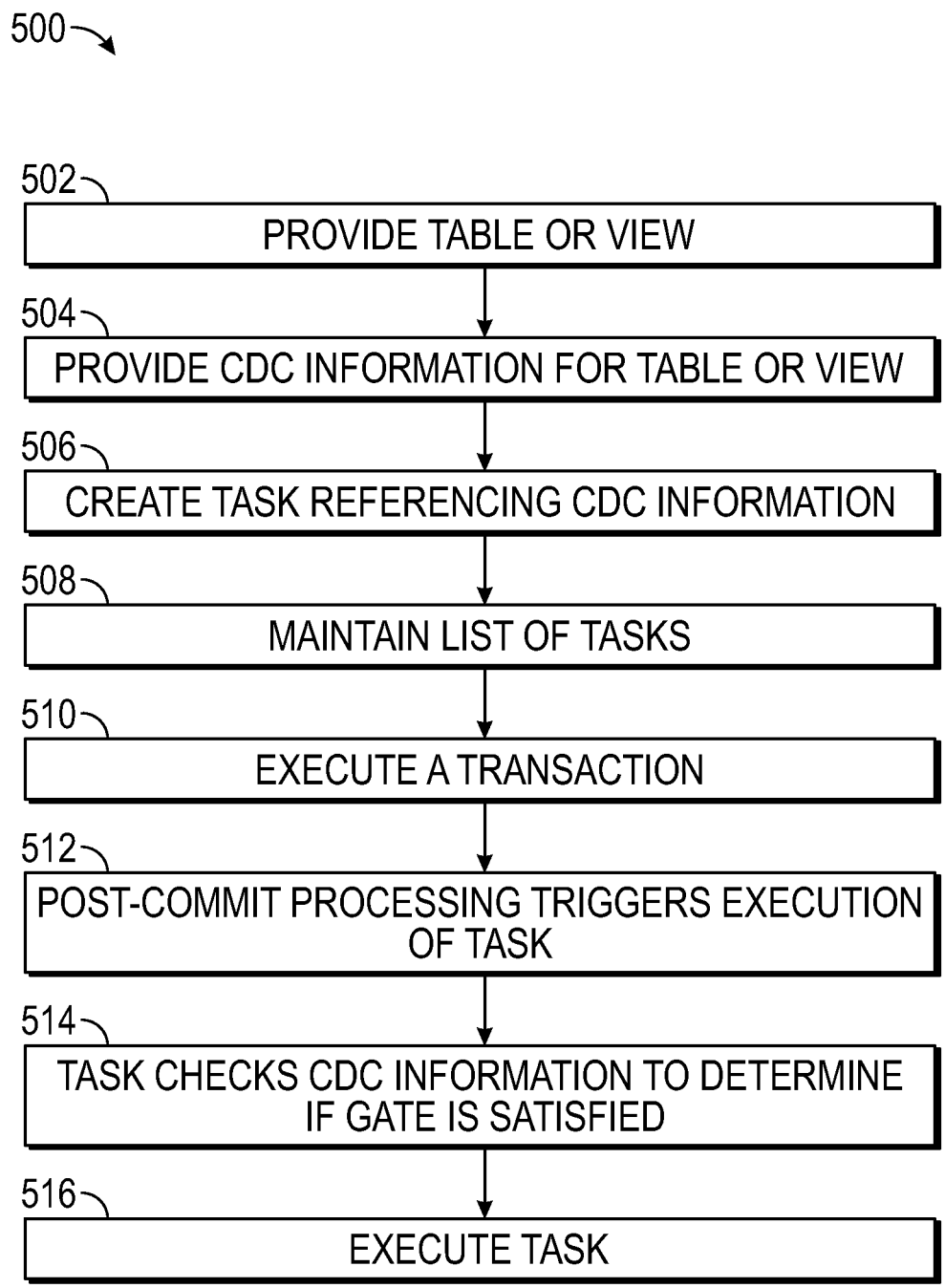
FIG. 5 illustrates a flow diagram from a method for triggering tasks, according to some example embodiments.

Streams or CDC information can be used as part of a triggering mechanism for tasks for implementing a data pipeline. FIG. 5 illustrates a flow diagram from a method 500 for triggering tasks, according to some example embodiments. At operation 502, a table or a view may be provided. For example, the table or view may be stored using the techniques described above with reference to FIGS. 1-3. At operation 504, CDC information or a stream indicating changes to the table or view may be provided. At operation 506, a task may be created that depends on the table or view by referencing the stream/CDC information. The task may also be called a subscriber task for the changes to the underlying table directly or indirectly via a view on the table. An example for creating a task called "task1"is illustrated:

```
CREATE TASK task1
WHEN
    SYSTEM$STREAM_HAS_DATA ('Table1Stream1')
AS
    [body of task1]
```

"Table1Stream1" represents the stream/CDC information for the underlying table "Table1". Thus, "task1" is triggered by a change committed to "Table1". When "task1" is triggered, the body of task1 is executed.

At operation 508, a list of tasks is maintained by the database system (e.g., database system 102). At operation 510, a transaction is executed, which results in a change to the data in the table. At operation 512, a post-commit processing of the transaction execution triggers the tasks from the list of tasks for immediate execution. The system may maintain a reverse mapping from table to dependent tasks. In the example above, task1 depends on table1. In some examples, a task can depend on more than one table. Moreover, a table may be associated with multiple task dependencies. Referring to the example above, when a new version for table1 is committed (i.e., change to the table results in the creation of a new version of a table), the dependency mapping is used to determine which tasks to trigger.

The triggered tasks may then be scheduled for processing by placing them in a queue of a background scheduler. This triggering is synchronous with the post-commit processing, but execution of the task is asynchronous with respect to the triggering. Consequently, the execution of the task is decoupled from the normal transaction execution, and the task execution does not impact the post-commit processing of the transaction.

At operation 514, the task may check the CDC information or stream to determine if the "gate" specified in its "when" clause, as described above, is satisfied. And if the gate in the "when" clause is satisfied the task is executed at operation 516. The task may act as the start of a data pipeline. In some embodiments, the task may, in turn, execute other tasks in a data pipeline.

Figure 6:
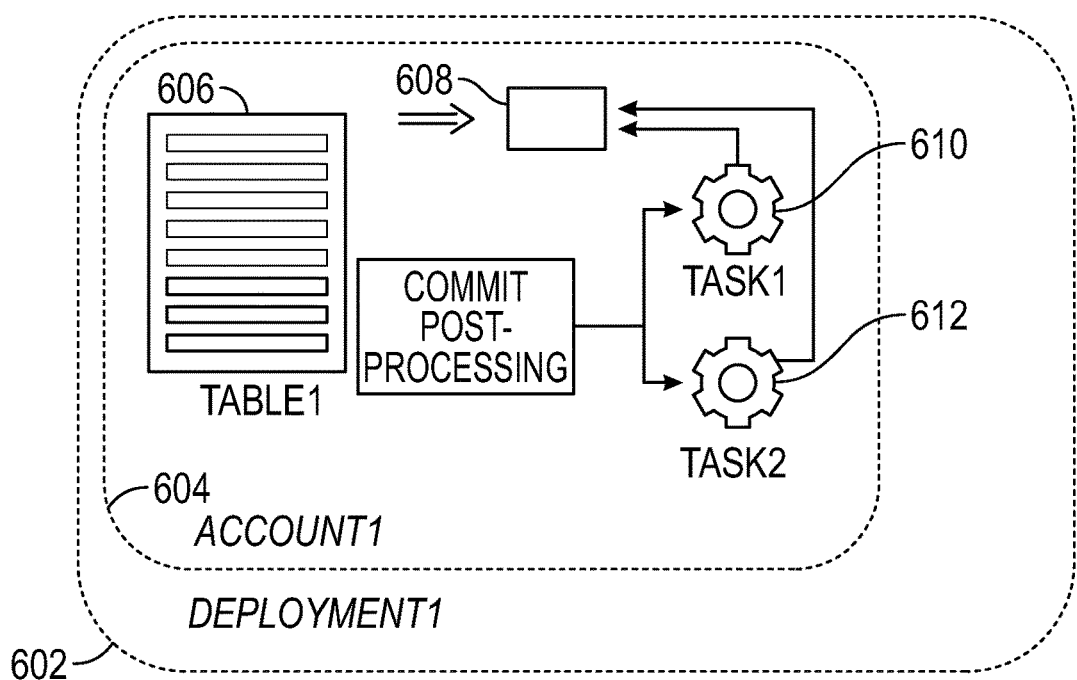
FIG. 6 illustrates triggering tasks in the same account, according to some example embodiments.

The task-triggering techniques can be used to trigger tasks in the same account as well as across accounts, organizations, and deployments. FIG. 6 illustrates triggering tasks in the same account, according to some example embodiments. In FIG. 6, a deployment 602 is provided. The deployment 602 may represent an instance of a data system, as described above, and may represent an instance of a data system provided in a particular region and a cloud provider. An account 604 may be provided within the deployment 602. The account 604 may belong to a particular organization or customer of a multi-tenant data system as described herein. In the account 604, a table 606 may be provided and stored. The table 606 may be stored using the techniques as described above. Moreover, operations (e.g., DML operations) may be executed on the table 606 using the computing architecture described above (e.g., compute service manager, execution platforms, etc.).

Here, a stream 608 may be generated from the table 606. Stream 608 may be a virtual table showing CDC information of the table 606. Moreover, two tasks 610, 612 are illustrated. These tasks 610, 612 are triggered using the techniques described herein. For example, when a transaction (e.g., one or more DML operations) is executed on table 606 resulting in a change to the data in the table 606, post commit processing of the transaction triggers tasks 610, 612. This triggering is synchronous with the post-commit processing, but execution of the task is asynchronous with respect to the triggering. Consequently, the execution of the task is decoupled from the normal transaction execution, and the task execution does not impact the post-commit processing of the transaction.

Tasks 610, 612 may then check stream 608 to determine if their respective "gate" specified in their "when" clauses, are satisfied. Each task 610, 612 may have their own gates. For example, the gate in task 610 may specify a change to certain rows in table 606 whereas the gate in task 612 may specify a change to another set of rows in table 606. These changes in the specified rows may be indicated in the stream 608. If the gate of the tasks 610, 612 are satisfied, the tasks 610, 612 may be executed. It could be that the change satisfies only one of the tasks (say, task 610). In this example, task 610 is executed and task 612 is not executed. If the gates in both tasks 610, 612 are satisfied, both tasks

610, 612 may be executed in parallel. The tasks 610, 612 may act as the start of a data pipeline. In some embodiments, the tasks 610, 612 may in turn execute other tasks in a data pipeline.

Figure 7:
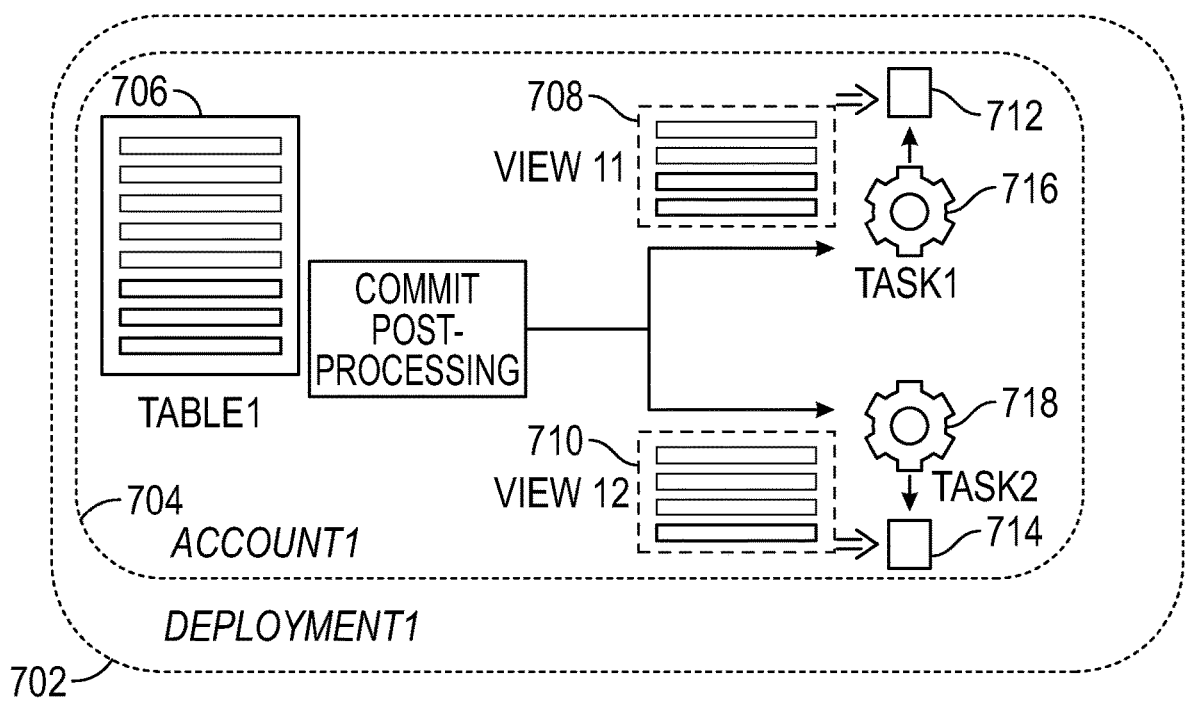
FIG. 7 illustrates triggering tasks using views, according to some example embodiments.

FIG. 7 illustrates triggering tasks using views, according to some example embodiments. In FIG. 7, a deployment 702 with an account 704 is provided as described above. In the account 704, a table 706 may be provided and stored as described above. Moreover, operations (e.g., DML operations) may be executed on the table 706 using the computing architecture described above (e.g., compute service manager, execution platforms, etc.).

Here, different views 708, 710 may be generated from table 706. Views may allow a result of a query to be accessed as if it were a table. Views 708, 710, for example, may be different views, representing different query results. Each view 708, 710 may have a respective stream 712, 714. For example, stream 712 may be a virtual table showing CDC information for view 708, and stream 714 may be a virtual table showing CDC information for view 710. In some embodiments, a single stream may be used to show CDC information for views 708, 710.

Tasks 716, 718 are shown and are triggered using the techniques described herein. For example, when a transaction (e.g., DML operation) is executed on table 706, resulting in a change to the data in the table 706, post commit processing of the transaction triggers tasks 716, 718. This triggering is synchronous with the post-commit processing, but execution of the task is asynchronous with respect to the triggering. Consequently, the execution of the task is decoupled from the normal transaction execution, and the task execution does not impact the post-commit processing of the transaction.

Moreover, the views 708, 710 may be refreshed based on the transaction. The refresh of the views 708, 710 may update their respective streams 712, 714 with the relevant CDC information. Tasks 716, 718 may then check their corresponding streams 712, 714 to determine if their respective "gate" specified in their "when" clauses, are satisfied. If the gate of the task 716 is satisfied, then task 716 may be executed, and if the gate of task 718 is satisfied, then task 718 is executed. If gates in both tasks 716, 718 are satisfied, both tasks 716, 718 may be executed in parallel. The tasks 716, 718 may act as the start of a data pipeline. In some embodiments, the tasks 716, 718 may in turn execute other tasks in a data pipeline.

The examples in FIGS. 6 and 7 have dealt with tasks within a single account. However, as described above, a database system may have multiple accounts or clients that each store unique sets of data within the database system, also referred to as a multi-tenant database system. In an example implementation, the database system may store and manage data for multiple businesses and each of the multiple businesses may have one or more accounts within the database system. In some scenarios, it may be desirable to permit two or more different accounts to share data. Data may be shared between a provider account that owns the data and a receiver account, which can then have access to the shared data.

Secure views may be used to share data across accounts while maintaining certain security and privacy restrictions. A view may be defined as a secure view when it is specifically designated for data privacy or to limit access to data that should not be exposed to all accounts of the underlying table. Data might be exposed in a secure view when, for example, an account has access to only a subset of data. Secure views permit a database account to expose a restricted data set to other accounts or users without the possibility of the underlying, unrestricted data being exposed to those other accounts or users. In some embodiments, a provider account can authorize cross-account access to its data to a receiver account. The provider account may limit the receiver account to viewing only certain data and may restrict the receiver account from viewing any underlying organization schema or statistics about the data.

In some embodiments, a secure view provides several security guarantees when compared against a regular view. In some embodiments, the secure view does not expose the view definition to non-owners of the view. This impacts various operations that access the data dictionary. In some embodiments, the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In some embodiments, the secure view does not expose data from tables accessed by the view which is filtered out by the view. In such an embodiment, a client account associated with a non-secure view may access data that would be filtered out by taking advantage of query optimizations that may cause user expressions to be evaluated before security expressions (e.g., filters and joins). In such embodiments, to achieve this requirement, the set of query optimizations that can be applied to a query containing a secure view may be restricted to guarantee that the user expressions that can leak data are not evaluated before the view is filtered.

In some embodiments, a secure view component may define the secure view using a SECURE keyword in a view field and may set or unset the SECURE property on a view using an ALTER VIEW command. In various embodiments, the secure view component may implement such commands at the manual direction of a client account or may be configured to automatically implement such commands. The secure view component may alter the parser to support the secure keyword before the view name and the new alter view rule. In an embodiment, the alter view rule may be more general to incorporate further view-level attributes. In terms of metadata support, the views may effectively be stored as tables, and the change may involve altering a table data persistence object that includes a secure flag indicating whether the view is a secure view (this may be implemented in addition to the view text comprising the secure tag). The secure user-defined function definition (i.e., the table data persistence object) may be hidden from users that are not the owner of the view. In such an embodiment, a command to show views will return results as usual to the owner of the view but will not return the secure user-defined function definition to a non-owner second account that has access to the view.

The secure view component may alter transformations of a parse tree, e.g., view merging and predicate information. The canonical implementation may include annotating query blocks such that the query blocks are designated as coming from secure view. In such an implementation, the query blocks cannot be combined with external query blocks (e.g., view merging) or expressions (e.g., via filter pushdown).

The secure view component may rewrite the query plan tree during optimization, e.g., during filter pullup and/or filter pushdown. The secure view component may be configured to ensure that no expression that does not stem from a secure view can be pushed down below the view boundaries. The secure view component may be configured to achieve this by implementing a new type of projection that behaves identically to a standard projection but, since it is not a standard projection, fails to match any of the rewrite rule preconditions. As a result, the relevant rewrites are not applied. The secure view component may be configured to identify what type of projection is to be generated (e.g., a standard projection or a secure projection) after query blocks have been designated as coming from a secure user-defined function definition or not. The secure view component may be configured to optimize performance for secure views in a zero-copy data sharing system.

Figure 8:
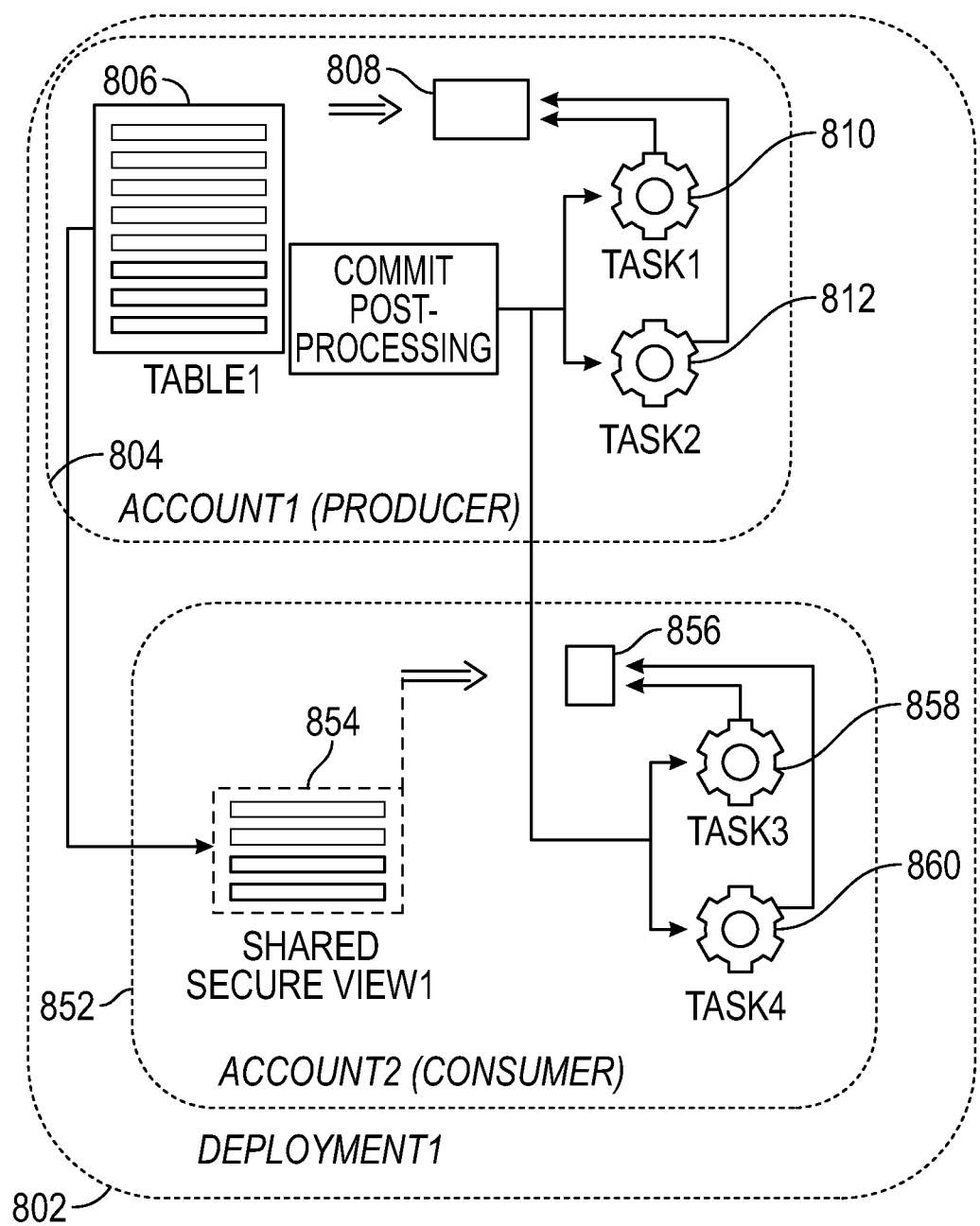
FIG. 8 illustrates triggering tasks using shared, secure views, according to some example embodiments.

FIG. 8 illustrates triggering tasks using shared, secure views, according to some example embodiments. In FIG. 8, a deployment 802 with a first account (Account 1 (Producer)) 804 is illustrated. In the account 804, a table 806 is provided. A stream 808, and tasks 810, 812 are also provided. These components in account 804 operate in substantially the same manner as described above with reference to FIG. 6.

In FIG. 8, a second account (Account2 (Consumer)) 852 is also provided in deployment 802. For example, the second account 852 may be for another customer in a multi-tenant database system as described above. In another example, the second account 852 may be within the same organization, which has multiple accounts with different privilege settings. The first account 804 is a provider account and the second account 852 is a consumer account for table 806 via shared secure view 854. The secure view 854 is specifically designated for data privacy or to limit access to data that should not be exposed to the second account 852 of the underlying table 806, as described above. Hence, users in the second account 852 may be able to run queries on the shared secure view 854.

Also, the second account 852 may set up tasks 858, 860 for the secure view 854 to be automatically triggered using the techniques described herein. A stream 856 may be generated for shared secure view 854. The stream 856 may be a virtual table showing CDC information for shared secure view 854.

Tasks 858, 860 are triggered using the techniques described herein. For example, when a transaction (e.g., DML, operation) is executed on table 806, resulting in a change to the data in the table 806, post commit processing of the transaction triggers tasks 858, 860. This triggering is synchronous with the post-commit processing, but execution of the task is asynchronous with respect to the triggering. Consequently, the execution of the task is decoupled from the normal transaction execution, and the task execution does not impact the post-commit processing of the transaction. In some embodiments, further filtering may be performed to ensure that only transactions viewable by the shared secure view 854 trigger tasks 858, 860, preventing users in account 852 from accessing restricted information in the underlying table 806.

The shared secure view 854 may be refreshed based on the transaction. The refresh of view 854 may update its corresponding stream 856 showing the relevant CDC information. Tasks 858, 860 may then check stream 856 to determine if their respective "gate" specified in their "when" clauses, are satisfied. If the respective gates in the tasks 858, 860 are satisfied, the corresponding tasks 858, 860 may be executed. If the gates in both tasks 858, 860 are satisfied, both tasks 858, 860 may be executed in parallel. The tasks 858, 860 may act as the start of a data pipeline. In some embodiments, the tasks 858, 860 may in turn execute other tasks in a data pipeline.

Figure 9:
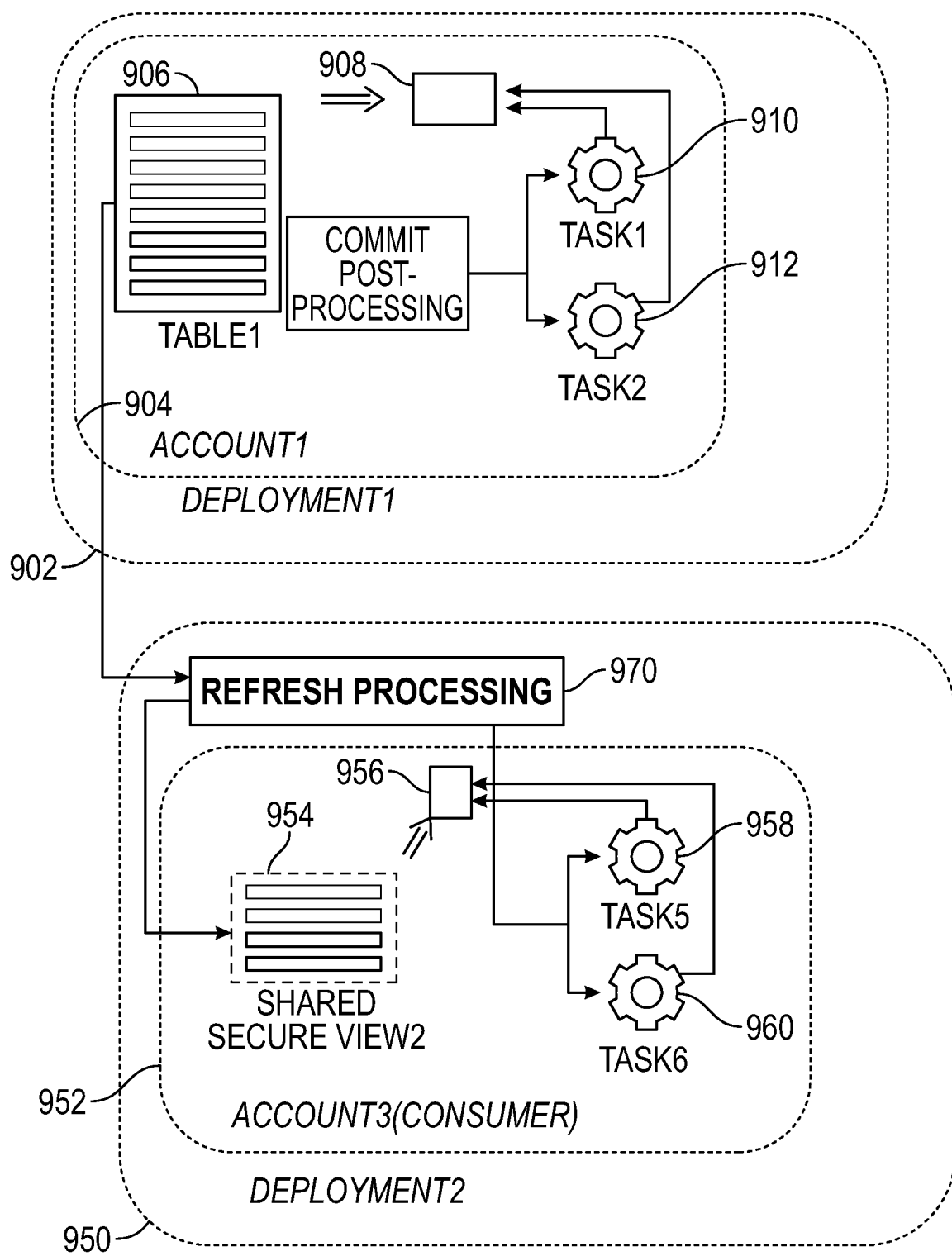
FIG. 9 illustrates triggering tasks using shared, secure views across deployments, according to some example embodiments.

FIG. 9 illustrates triggering tasks using shared, secure views across deployments, according to some example embodiments. In FIG. 9, a deployment 902 with a first account (Account 1 (Producer)) 904 is illustrated. In the account 904, a table 906 is provided. A stream 908 and tasks 910, 912 are also provided. These components in account 904 operate in substantially the same manner as described above with reference to FIG. 6.

Here, a second deployment 950 is shown. The first and second deployments 902, 950 may represent different instances of a data system, as described herein. For example, the first deployment 902 may represent an instance of the database system provided using AWS cloud components in the west coast of the United States, and the second deployment 950 may represent an instance of the database system provided using Azure cloud components in Europe.

A second account (Account3 (Consumer)) 952 is provided in the second deployment 950. This second account 952 may be for another customer in a multi-tenant database system as described above or for different accounts in the same organization as described above. The first account 904 is a provider account and the second account 952 is a consumer account for table 906 via shared secure view 954. The secure view 954 is specifically designated for data privacy or to limit access to data that should not be exposed to the second account 952 of the underlying table 906, as described above. Hence, users in the second account 952 may be able to run queries on the shared secure view 954. Moreover, since the second account 952 here is provided in a different deployment, the data in the shared secure view 954 may be replicated using refresh processing 970. As described in further detail below, the refresh processing 970 may also be used to trigger tasks in the second account 952.

The second account 952 may set up tasks 958, 960 for the secure view 954 to be automatically triggered using the techniques described herein. A stream 956 may be generated for shared secure view 954. The stream 956 may be a virtual table showing CDC information for shared secure view 954.

Tasks 958, 960 are triggered using the techniques described herein but using refresh processing 970. For example, when a transaction (e.g., DML operation) is executed on table 906 resulting in a change to the data in the table 906, that change may be captured by the refresh processing 970 in the second deployment 950. Refresh processing 970 is the process of identifying, transferring, and applying the new data in the first deployment 902 that need to be replicated over to the second deployment 950. This last step applies the changes as transactions on the replicated tables in the second deployment 950.

The refresh processing 970 may then trigger the tasks 958, 960. For example, applying the changes to the replicated table, as described above, may trigger the tasks. This triggering is synchronous with the post-commit processing, but execution of the task is asynchronous with respect to the triggering. Consequently, the execution of the task is decoupled from the normal transaction execution, and the task execution does not impact the post-commit processing of the transaction. In some embodiments, further filtering may be performed to ensure that only transactions viewable by the shared secure view 954 trigger tasks 958, 960.

The shared secure view 954 may be refreshed based on the transaction using refresh processing 970. The refresh of view 954 may update its corresponding stream 956 showing the relevant CDC information. Tasks 958, 960 may then check stream 956 to determine if their respective "gate" specified in their "when" clauses, are satisfied. If the respective gates of the tasks 958, 960 are satisfied, the corresponding tasks 958, 960 may be executed. If gates in both tasks 958, 960 are satisfied, both tasks 958, 960 may be executed in parallel. The tasks 958, 960 may act as the start of a data pipeline. In some embodiments, the tasks 958, 960 may in turn execute other tasks in a data pipeline.

Mechanisms may be used to control the frequency of task execution. In some embodiments, debouncing may be used to group a fast sequence of transactions together in a single task execution. That is, if the system detects a sequence of transactions are committed within a minimum time threshold (i.e., quick succession), the system may group those transactions together for a single task execution. Debouncing can prevent thrashing and potentially erroneous execution if multiple instances of the same task are enqueued for execution simultaneously.

In some embodiments, throttling may be used to prevent multiple instances of the same task to run simultaneously. Here, if a task is set to be triggered while it is executing from a prior trigger, the system may throttle triggering the task for the duration of the current task execution. For example, if a first transaction is committed and it triggers a task, the task will start its execution. During that task's execution, if a second transaction is committed and that second transaction is set to trigger the task, too, the system may prevent the task from being re-triggered while it is executing in response to the first transaction commit. After the task execution for the first transaction commit is completed, the system may then allow the task to be triggered in response to the second transaction.

Figure 10:
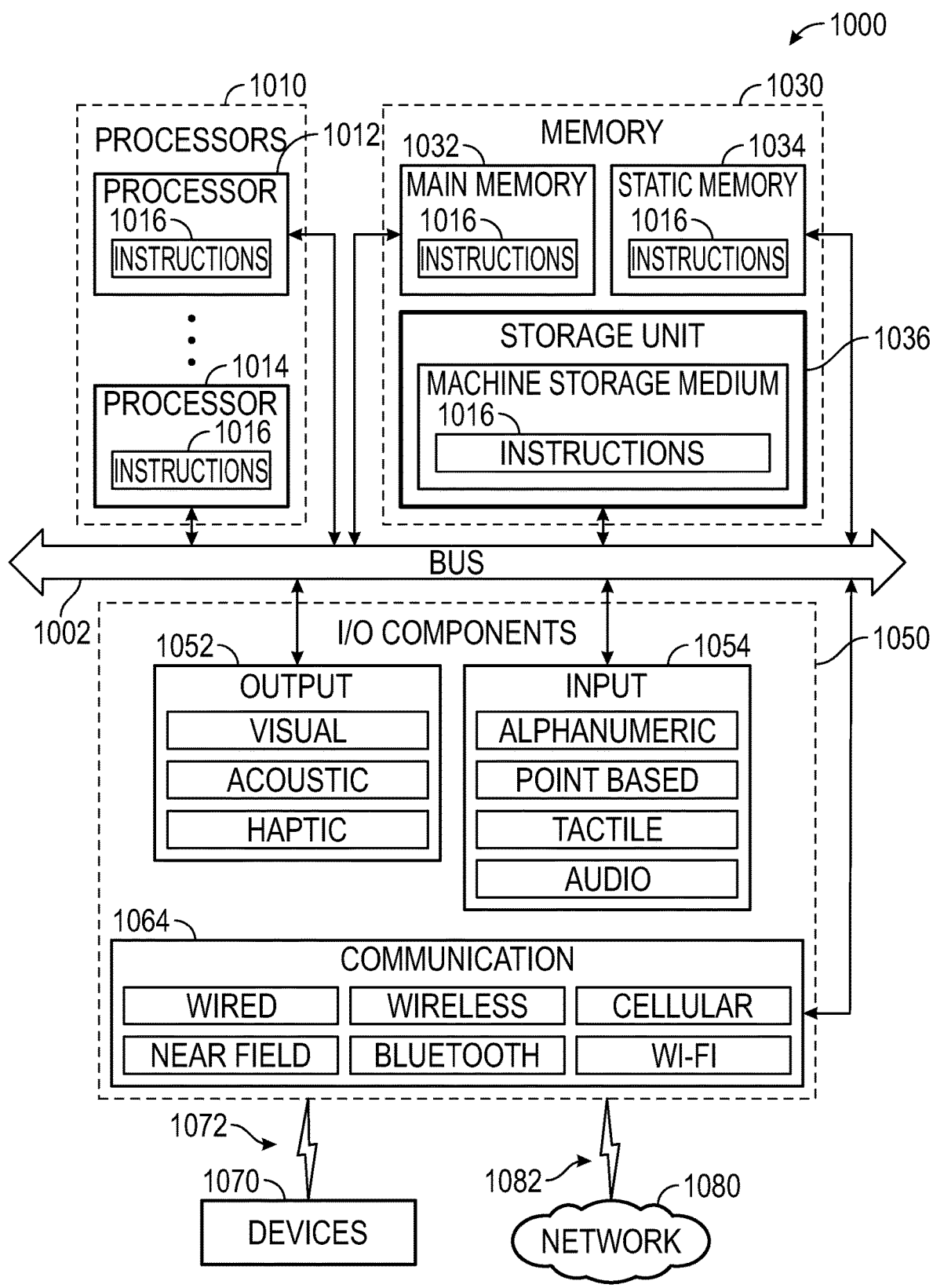
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods described herein. As another example, the instructions 1016 may cause the machine 1000 to implement portions of the data flows described herein. In this way, the instructions 1016 transform a general, non-programmed machine into a particular machine 1000 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 118, the compute service manager 112, the execution platform 114, the Web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: providing a table in a first account of a multi-tenant network database system; generating, by a processor, change data capture information showing changes to the table; creating a first task in the first account, the first task being defined by a gate clause; executing a transaction resulting in a change to the table; triggering execution of the first task based on commit post-processing of the transaction; determining that the gate clause in the first task is satisfied based on the generated change data capture information; and in response to determining that the gate clause is satisfied, executing the first task.

Example 2. The method of example 2, further comprising: maintaining a list of tasks referencing the table.

Example 3. The method of any of examples 1-2, further comprising: generating a view of the table, wherein the first task directly references the view and wherein the change data capture information directly references the view.

Example 4. The method of any of examples 1-3, further comprising: generating a secure view of the table for a second account; generating change data capture information showing changes to the secure view in the second account; creating a second task in the second account, the second task being defined by a second gate clause; triggering execution of the second task based on commit post-processing of the transaction; determining the second gate clause in the second task is satisfied based on the change data capture information for the secure view; and in response to determining that the second gate clause is satisfied, executing the second task.

Example 5. The method of any of examples 1-4, wherein the first account and second account are in a single deployment of the multi-tenant network database system.

Example 6. The method of any of examples 1-5, wherein the first account is in a first deployment of the multi-tenant network database system and the second account is in second deployment of the multi-tenant network database system.

Example 7. The method of any of examples 1-6, further comprising: providing a refresh processing element in the second deployment, wherein the secure view references the refresh processing element and wherein the refresh processing element triggers execution of the second task.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
   storing a table in a first account using one or more data storage devices of a multi-tenant network database system;
   generating a secure view of the table;
   sharing the secure view with a second account of the multi-tenant network database system, the secure view limiting access of at least a portion of the table to the second account;
   generating change data capture information showing changes to the secure view in the second account based on at least one operation performed on the table by one or more execution platforms assigned to the first account, the one or more execution platforms being decoupled from the one or more data storage devices;
   creating a task in the second account, the task being defined by a gate clause;
   determining the gate clause in the task is satisfied based on the change data capture information for the secure view; and
   in response to determining that the gate clause is satisfied, executing the task to update the secure view.

2. The method of claim 1, wherein the task is triggered based on commit-processing of the at least one operation.

3. The method of claim 1, wherein the first account and second account are in a single deployment of the multi-tenant network database system.

4. The method of claim 3, wherein the first account is in a first deployment of the multi-tenant network database system and the second account is in second deployment of the multi-tenant network database system.

5. The method of claim 4, further comprising:
providing a refresh processing element in the second deployment, wherein the secure view references the refresh processing element and wherein the refresh processing element triggers execution of the second task.

6. The method of claim 1, further comprising:
maintaining a list of tasks referencing the table.

7. The method of claim 1, wherein the secure view restricts access by the second account to a subset of data in the table.

8. A non-transitory machine-storage medium embodying instructions that, when executed by a machine, cause the machine to perform actions comprising:
storing a table in a first account using one or more data storage devices of a multi-tenant network database system;
generating a secure view of the table;
sharing the secure view with a second account of the multi-tenant network database system, the secure view limiting access of at least a portion of the table to the second account;
generating change data capture information showing changes to the secure view in the second account based on at least one operation performed on the table by one or more execution platforms assigned to the first account, the one or more execution platforms being decoupled from the one or more data storage devices;
creating a task in the second account, the task being defined by a gate clause;
determining the gate clause in the task is satisfied based on the change data capture information for the secure view; and
in response to determining that the gate clause is satisfied, executing the task to update the secure view.

9. The non-transitory machine-storage medium of claim 8, wherein the task is triggered based on commit-processing of the at least one operation.

10. The non-transitory machine-storage medium of claim 8, wherein the first account and second account are in a single deployment of the multi-tenant network database system.

11. The non-transitory machine-storage medium of claim 10, wherein the first account is in a first deployment of the multi-tenant network database system and the second account is in second deployment of the multi-tenant network database system.

12. The non-transitory machine-storage medium of claim 11, further comprising:
providing a refresh processing element in the second deployment, wherein the secure view references the refresh processing element and wherein the refresh processing element triggers execution of the second task.

13. The non-transitory machine-storage medium of claim 8, further comprising:
maintaining a list of tasks referencing the table.

14. The non-transitory machine-storage medium of claim 8, wherein the secure view restricts access by the second account to a subset of data in the table.

15. A system comprising:
at least one hardware processor; and
at least one memory storing instructions that, when executed by the at least one hardware processor, cause the at least one hardware processor to perform actions comprising:
storing a table in a first account using one or more data storage devices of a multi-tenant network database system;
generating a secure view of the table;
sharing the secure view with a second account of the multi-tenant network database system, the secure view limiting access of at least a portion of the table to the second account;
generating change data capture information showing changes to the secure view in the second account based on at least one operation performed on the table by one or more execution platforms assigned to the first account, the one or more execution platforms being decoupled from the one or more data storage devices;
creating a task in the second account, the task being defined by a gate clause;
determining the gate clause in the task is satisfied based on the change data capture information for the secure view; and
in response to determining that the gate clause is satisfied, executing the task to update the secure view.

16. The system of claim 15, wherein the task is triggered based on commit-processing of the at least one operation.

17. The system of claim 15, wherein the first account and second account are in a single deployment of the multi-tenant network database system.

18. The system of claim 17, wherein the first account is in a first deployment of the multi-tenant network database system and the second account is in second deployment of the multi-tenant network database system.

19. The system of claim 18, further comprising:
providing a refresh processing element in the second deployment, wherein the secure view references the refresh processing element and wherein the refresh processing element triggers execution of the second task.

20. The system of claim 17, further comprising:
maintaining a list of tasks referencing the table.

21. The system of claim 17, wherein the secure view restricts access by the second account to a subset of data in the table.

* * * * *